F. J. MATTHEWS & J. A. JOHNSTON.
TRAP OR DRAIN.
APPLICATION FILED AUG. 17, 1912.
1,099,069. Patented June 2, 1914.
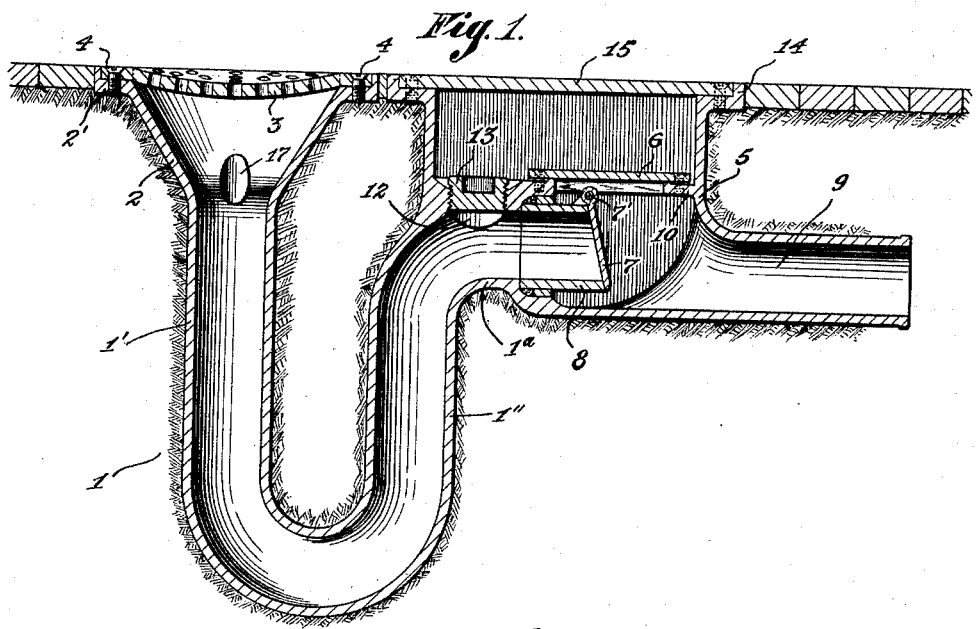
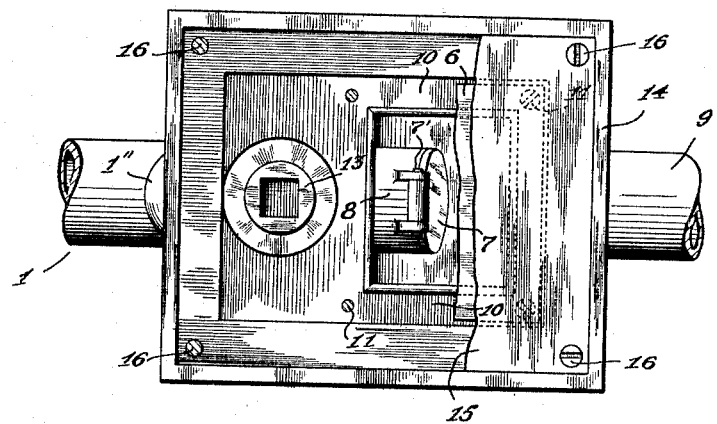
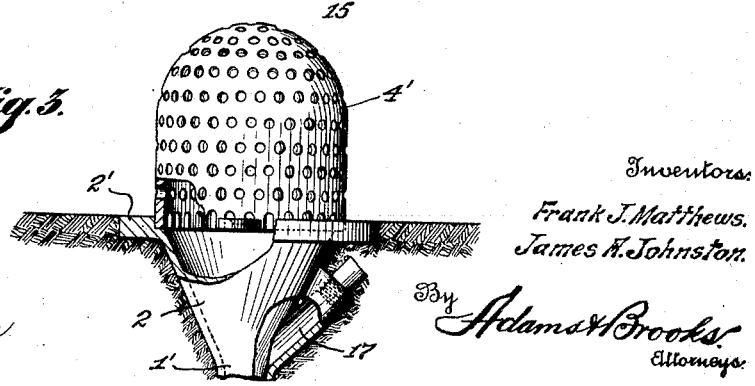
Witnesses
Inventors:
Frank J. Matthews.
James A. Johnston.
By Adams & Brooks
Attorneys

UNITED STATES PATENT OFFICE.

FRANK J. MATTHEWS AND JAMES A. JOHNSTON, OF SEATTLE, WASHINGTON.

TRAP OR DRAIN.

1,099,069.  Specification of Letters Patent.  Patented June 2, 1914.

Application filed August 17, 1912. Serial No. 715,686.

*To all whom it may concern:*

Be it known that we, FRANK J. MATTHEWS and JAMES A. JOHNSTON, citizens of the United States, residing at Seattle, in the county of King and State of Washington, have invented certain new and useful Improvements in Traps or Drains, of which the following is a specification.

Our invention relates to traps and drains of the type having a back water or pressure valve for preventing the flooding of cellars, basements and the like in which the trap may be installed, and it has for its primary object to provide a generally simplified and improved construction, to the interior of which access can be readily had. We accomplish this object and other objects, which will be more fully set forth as the description progresses, by the construction shown in the accompanying drawing wherein we have illustrated a preferred form of our invention:

Figure 1 is a vertical longitudinal section of our invention installed. Fig. 2 is a top plan, parts being broken away, and Fig. 3 is a fragmentary elevation of the invention equipped with a strainer of an alternative form, portions of the trap and strainer being broken away.

Referring to the drawing by numerals of reference 1 indicates a U-trap or water seal, the downtake limb 1′ of which has its upper end portion flared, as at 2, to provide a wide mouth across which a strainer 3 extends. Flared portion 2 is provided with a flange 2′ which is grooved to provide a seat for strainer 3, and said strainer is preferably held in the seat of this flange by screws 4.

An alternative form of strainer is shown in Fig. 3 of the drawing, this strainer 4′ being of convex form and projecting upwardly from the floor or surface, with which latter flange 2′ of the trap is normally arranged flush, as clearly shown in Figs. 1 and 3.

The uptake limb 1″ of trap 1 is provided with an angularly disposed upper terminal portion 1ª which projects into a casing 5 beneath a removable plate or partition 6 thereof.

Reference numeral 7 indicates a back water valve, the same being pivotally supported at 7′ on the outer end of a cylindrical support 8 which is removably secured, in any suitable manner, in the end of terminal limb portion 1ª to lie directly opposite and in substantial alinement with an out go passage 9 which latter is normally connected with the sewer, as is well understood.

Casing 5 is formed integral with the uptake limb 1″, and terminal portion 1ª enters the lower portion thereof from one side.

Reference numeral 10 indicates a flange projecting from the inner face of casing 5 and on which plate or removable partition section 6 is secured by screw bolts 11.

Within casing 5, we provide terminal limb portion 1ª in its upper wall portion with a hand hole 12 which is normally closed by a screw plug 13, this hand hole thus occurring in advance of valve 7 and in such relation to trap uptake limb 1″ as to permit of ready access thereto.

By removing plate 6, valve 7 and outgo pipe 9 will be exposed.

Casing 5 is provided at its upper end portion with an external flange 14 which lies in substantially the plane of flange 2′ and is grooved or cut out to provide a seat for a removable cover 15, which latter is secured in position by screws 16.

Reference numeral 17 indicates a fluid inlet through which water can be admitted to the trap for flushing purposes, this being formed in flared portion 2 of limb 1′ and adapted to be connected with a source of supply of water, as with a city main, whereby water can be admitted to trap 1 at intervals.

Flange 10, aside from supporting plate 6 and acting in conjunction therewith to divide casing 5 into upper and lower chambers, acts as a stop for limiting opening movement of valve 7.

The construction described is extremely simple, access can be readily had to the structure through independent openings both forwardly and rearwardly of the valve, it is sanitary, and further it can be readily flushed.

Having thus described our invention, what we claim as new, and desire to secure by Letters Patent of the United States of America, is:

In a device of the character set forth, a U-trap having the upper portion of its uptake limb angularly disposed to substantially a horizontal, a casing divided into upper and lower chambers and receiving the terminal portion of the trap uptake limb in its lower chamber, said casing being provided with a hand opening leading to the horizontal terminal portion of the uptake limb and offset from the latter, the casing being further provided with a second opening beyond the terminal of the uptake limb and establishing communication between the chambers of the casing, a support comprising a length of pipe secured to the terminal portion of the uptake limb and extending into the lower chamber and beneath the second opening of the casing, a valve pivoted to the support for swinging into the lower chamber of the casing, and closures for the openings aforesaid of the casing whereby the upper chamber of the latter remains free of liquid.

In testimony whereof we affix our signatures in presence of two witnesses.

FRANK J. MATTHEWS.
JAMES A. JOHNSTON.

Witnesses:
STEPHEN A. BROOKS,
CLARA A. HARM.

Copies of this patent may be obtained for five cents each, by addressing the "Commissioner of Patents, Washington, D. C."